United States Patent
Lee et al.

(10) Patent No.: US 9,396,033 B2
(45) Date of Patent: Jul. 19, 2016

(54) METHOD OF EXECUTING PARALLEL APPLICATION ON MANYCORE CLUSTER SYSTEM AND THE MANYCORE CLUSTER SYSTEM

(71) Applicant: SNU R&DB FOUNDATION, Seoul (KR)

(72) Inventors: Jaejin Lee, Seoul (KR); Jungwon Kim, Seoul (KR)

(73) Assignee: SNU R&DB FOUNDATION, Seoul (KR)

(*) Notice: Subject to any disclaimer, the term of this patent is extended or adjusted under 35 U.S.C. 154(b) by 94 days.

(21) Appl. No.: 14/321,378

(22) Filed: Jul. 1, 2014

(65) Prior Publication Data

US 2015/0205637 A1    Jul. 23, 2015

(30) Foreign Application Priority Data

Jan. 23, 2014    (KR) .................. 10-2014-0008392

(51) Int. Cl.
*G06F 9/46*    (2006.01)
*G06F 9/50*    (2006.01)
*H04L 29/08*    (2006.01)
*G06N 99/00*    (2010.01)

(52) U.S. Cl.
CPC .............. *G06F 9/505* (2013.01); *G06N 99/005* (2013.01); *H04L 67/10* (2013.01)

(58) Field of Classification Search
None
See application file for complete search history.

(56) References Cited

U.S. PATENT DOCUMENTS 8,954,981 B2 * 2/2015 Harris .................. G06F 9/5072
709/226
2014/0173623 A1 * 6/2014 Chang .................. G06F 9/5088
718/105

FOREIGN PATENT DOCUMENTS

| JP | 2011-138506 A | 7/2011 |
| KR | 10-2009-0063122 A | 6/2009 |
| KR | 10-2011-0060849 A | 6/2011 |
| KR | 10-2013-0088512 A | 8/2013 |
| KR | 10-2014-0006351 A | 1/2014 |
| WO | 2012/049247 A1 | 4/2012 |

OTHER PUBLICATIONS

Mizra, Mariyam et al., "A machine learning approach to TCP throughput prediction," SIGMETRICS '07 Proceedings of the 2007 ACM SIGMETRICS International Conference on Measurement and Modeling of Computer Systems, Jun. 12-16, 2007, pp. 97-108.*

* cited by examiner

*Primary Examiner* — Gregory A Kessler
(74) *Attorney, Agent, or Firm* — KORUS Patent, LLC; Seong Il Jeong (57) ABSTRACT

Provided are a method of executing parallel programming on a manycore cluster system and the manycore cluster system, both of which may make a parallel application targeting on one compute device operate on a heterogeneous manycore cluster system configured of a plurality of compute devices, without modifying source codes. Up to now, programmers have had to manually distribute an appropriate workload amount to the compute devices according to a throughput of each compute device. However, since the method and the manycore cluster system can reduce the complexity of programming and provide an heterogeneous manycore cluster environment that allows programmers to develop easily.

8 Claims, 7 Drawing Sheets

METHOD OF EXECUTING PARALLEL APPLICATION ON MANYCORE CLUSTER SYSTEM AND THE MANYCORE CLUSTER SYSTEM

BACKGROUND OF THE INVENTION

1. Field of the Invention

The present invention relates, generally, to a method of executing parallel application on a manycore cluster system and the manycore cluster system and, more particularly, to a method of executing parallel application on a manycore cluster system based on a parallel computing framework, and to the manycore cluster system.

2. Description of the Related Art

In recent years, general desktop computers have also been mounted with a quad- or hexa-core central processing unit (CPU) for high-performance computing (HPC). Graphic processing units (GPUs) capable of performing general computations in addition to graphic processing have also had the capability to perform HPC using a compute unified device architecture (CUDA) or an open computing language (OpenCL). To use hardware for HPC in this way, a parallel programming model suitable for this should be used. OpenCL has recently been in the limelight as a representative parallel programming model.

OpenCL makes it possible to write programs operated on multi-platforms (for example, a plurality of CPUs or GPUs), and to expand the capacity of the graphic processing unit (GPU) to regions (general-purpose GPU) other than graphic processing. Since OpenCL can operate on various hardware produced by various hardware manufacturers, many manufacturers develop frameworks suitable for their own hardware on the basis of OpenCL.

As disclosed in Korean Unexamined Patent Application Publication No. 2009-0063122A (published on Jun. 17, 2009), managing a workload of a system is important for reducing a load of the system and improving a process speed.

However, an OpenCL application can be applied to only one node. Thus, in order to expand the OpenCL application to a cluster environment and distribute the workload, a message passing interface (MPI) for communication between devices and between nodes should be added to the OpenCL application. In view of a characteristic of parallel programming, the addition of the MPI to the OpenCL application can increase complexity of coding. Further, when compute devices in the manycore cluster system are different from each other, the workload should be distributed into the nodes of the manycore cluster system.

Thus, in order to distribute the workload created by execution of the OpenCL application in the cluster environment, much additional programming should be required. As a result, the productivity of programs and portability of OpenCL are reduced.

Accordingly, technology for solving the above-described problems is required.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Unexamined Patent Application Publication No. 2009-0063122A (published on Jun. 17, 2009)

SUMMARY OF THE INVENTION

According to an embodiment of the present invention, in order to reduce the complexity of programming occurred from the distribution of a workload created by one node in a cluster system, the workload is automatically distributed in consideration of a throughput of each compute device in the cluster system.

To accomplish the above-described technical object, according to a first aspect of the present invention, a method of executing parallel application on a manycore cluster system comprising a plurality of nodes, each of which comprises at least one compute device. The method may comprise the steps of: a) executing a parallel application by at least one node; b) predicting a data throughput of the at least one compute device comprised in each node by the at least one node; and c) distributing a workload accompanied by the execution of the parallel application to the at least one compute device comprised in each node according to the predicted data throughput of the compute device.

The step b) may comprise predicting the data throughput of the at least one compute device using machine learning model.

The step b) may comprise predicting a execution time which the at least one node requires to execute the parallel application, and predicting the data throughput of each compute device on the basis of the predicted execution time.

The compute device may comprise any one of a central processing unit (CPU), a graphics processing unit (GPU), and another device supporting the execution of the parallel application.

The step b) may include the sub-steps of: b1) extracting a feature value of a kernel for the manycore cluster system; b2) predicting a execution time of the kernel using a execution-time prediction algorithm; b3) predicting an overall execution time which the manycore cluster syst requires to execute the parallel application on the basis of the feature value of the kernel and the execution time of the kernel; and b4) predicting the data throughput of each compute device on the basis of the predicted overall execution time.

The sub-step b1) may comprise extracting a hardware performance value of each compute device, and extracting the feature value of the kernel for each compute device on the basis of the hardware performance value.

The sub-step b1) may comprise the sub-steps of: b11) sampling a first portion of the workload from a CPU of the at least one node to extract a hardware performance value of a GPU included in the at least one node on the basis of the sampled first portion of the workload; b12) sampling a second portion of the workload from the CPU from which the first portion of the workload is sampled, and extracting a hardware performance value of the CPU from which the second portion of the workload is sampled; and b13) extracting a feature vector of the kernel of the compute device within one of the nodes on the basis of at least one of the hardware performance values of the CPU and the GPU.

The step c) may comprise distributing the workload to at least one compute device without modification of source codes of the parallel application.

The manycore cluster system may be a heterogeneous manycore cluster system.

Meanwhile, according to a second aspect of the present invention, a manycore cluster system comprises a plurality of nodes, each of which comprises at least one compute device and executes a parallel application. At least one of the plurality of nodes comprises a machine learning engine that predicts a data throughput of the at least one compute device, and a workload accompanied by the parallel application executed by at least one of the plurality of nodes is distributed to the at least one compute device according to the data throughput of the compute device which is predicted by the machine learning engine.

The machine learning engine may predict the data throughput of the at least one compute device using machine learning model.

The machine learning engine may predict a execution time which the at least one node requires to execute the parallel application, and predict the data throughput of each compute device on the basis of the predicted execution time.

The compute device may comprise any one of a central processing unit (CPU), a graphics processing unit (GPU), and another device supporting the execution of the parallel application.

The machine learning engine may perform the steps of: a) extracting a feature value of a kernel for the manycore cluster system; b) predicting a execution time of the kernel using a execution-time prediction algorithm; c) predicting an overall execution time which the manycore cluster system requires to execute the parallel application on the basis of the feature value of the kernel and the execution time of the kernel; and d) predicting the data throughput of each compute device on the basis of the predicted overall execution time.

The machine learning engine may extract a hardware performance value of each compute device, and extracts the feature value of the kernel for each compute device on the basis of the hardware performance value.

The step a) performed by the machine learning engine may comprise the sub-steps of: a1) sampling a first portion of the workload from a CPU of the at least one node to extract a hardware performance value of a GPU included in the at least one node on the basis of the sampled first portion of the workload; a2) sampling a second portion of the workload from the CPU from which the first portion of the workload is sampled, and extracting a hardware performance value of the CPU from which the second portion of the workload is sampled; and a3) extracting a feature vector of the kernel of the compute device within one of the nodes on the basis of at least one of the hardware performance values of the CPU and the GPU.

The workload may be distributed to at least one compute device without modification of source codes of the parallel application.

The manycore cluster system may be a heterogeneous manycore cluster system.

According to any one of the above-described solutions of the present invention, an embodiment of the present invention can operate an OpenCL application targeting on one compute device in a cluster system configured of a plurality of compute devices, without modifying source codes.

In the related art, a programmer has had to manually distribute an amount of workload to compute devices appropriately according to the throughput of each compute device. However, an embodiment of the present invention can reduce the complexity of programming and provide an heterogeneous manycore cluster environment that allows programmers to develop easily.

Effects that can be obtained from the present invention are not limited to the above-described effects. Other effects that are not mentioned will be clearly understood by those skilled in the art from the following description.

DETAILED DESCRIPTION OF THE INVENTION

Hereinafter, the embodiments of the present invention will be described in detail with reference to the accompanying drawings so as to be easily implemented by those skilled in the art. However, the present invention may be variously implemented and is not limited to the embodiments described herein. In the drawings, in order to clearly describe the present invention, portions which are not related to the description of the present invention will be omitted and similar portions are denoted by similar reference numerals throughout the specification.

It will be understood that, throughout the specification, when an element is referred to as being "connected" or "coupled" to another element, it can be directly connected or coupled to the other element, or it can be electrically connected to the other element via an intervening element. In addition, it will be understood that, unless explicitly stated to the contrary, the term "comprise" and its conjugations such as "comprises" and "comprising" should be interpreted as including any stated elements but not necessarily excluding other elements.

In the following description, a "cluster system" is a set of computers connected over a network, and means a system enables a client to be used as one computer. This cluster system causes a plurality of computers to cooperate with each other, thereby making it possible to improve reliability and processing capability that cannot be obtained from one computer. In addition, a "manycore cluster environment" or a "manycore cluster system" means a system in which each computer constituting the cluster system functions as a manycore processor.

Hereinafter, the present will be described in detail with reference to the accompanying drawings.

Figure 1:
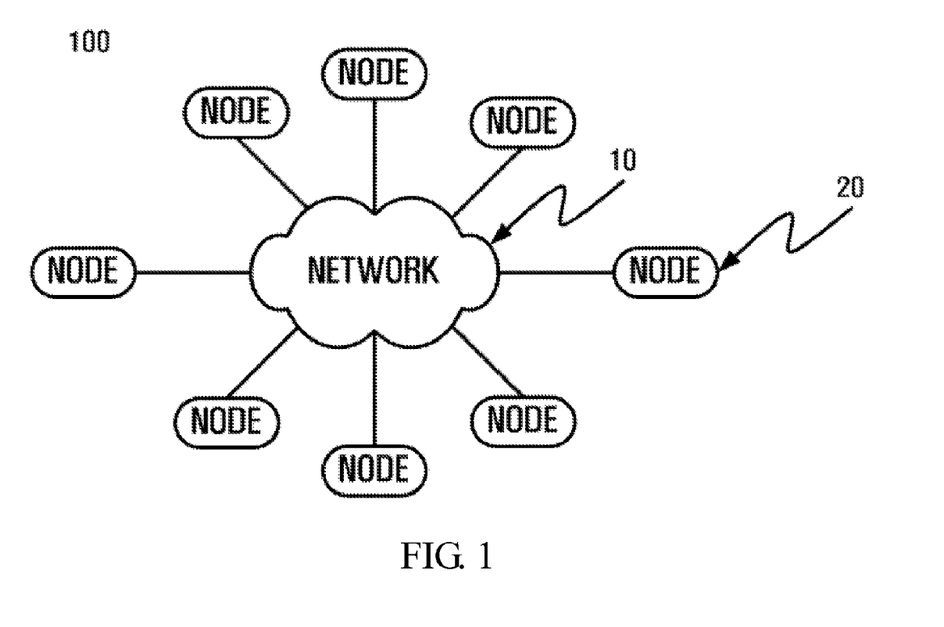
FIG. 1 is a configuration view of a manycore cluster system according to an embodiment of the present invention.

FIG. 1 is a configuration view of a manycore cluster system according to an embodiment of the present invention.

A cluster system 100 is a heterogeneous or homogeneous manycore cluster system. The cluster system 100 is a system in which one or more nodes 20 constituting compute devices are connected through a network 10. Here, each node 20 is configured to execute an open computing language (OpenCL) application.

In the cluster system 100, the network 10 that mutually connects the nodes 20 may be realized as an interconnection network such as an InfiniBand or an Ethernet. Alternatively, the network 10 may be realized as all types of wired/wireless networks such as a local area network (LAN), a wide area network (WAN), a value added network (VAN), a personal area network (PAN), a mobile radio communication network, a wireless broadband Internet (WiBro), mobile worldwide interoperability for microwave access (WiMAX), high speed downlink packet access (HSDPA), or a satellite communication network.

Each node 20 is a compute device that performs an information processing function and a communication function on the cluster system 100. The node 20 may be configured in a form of a computer or a terminal such as a remote processor. Further, each node 20 may perform functions such as information processing independently of the other nodes, or in cooperation with the other nodes through parallel programming. Each node 20 can perform communication for executing the OpenCL application through the network 10. Such a node may be a transmission source, a reception destination, or a repeater for data.

Figure 2:
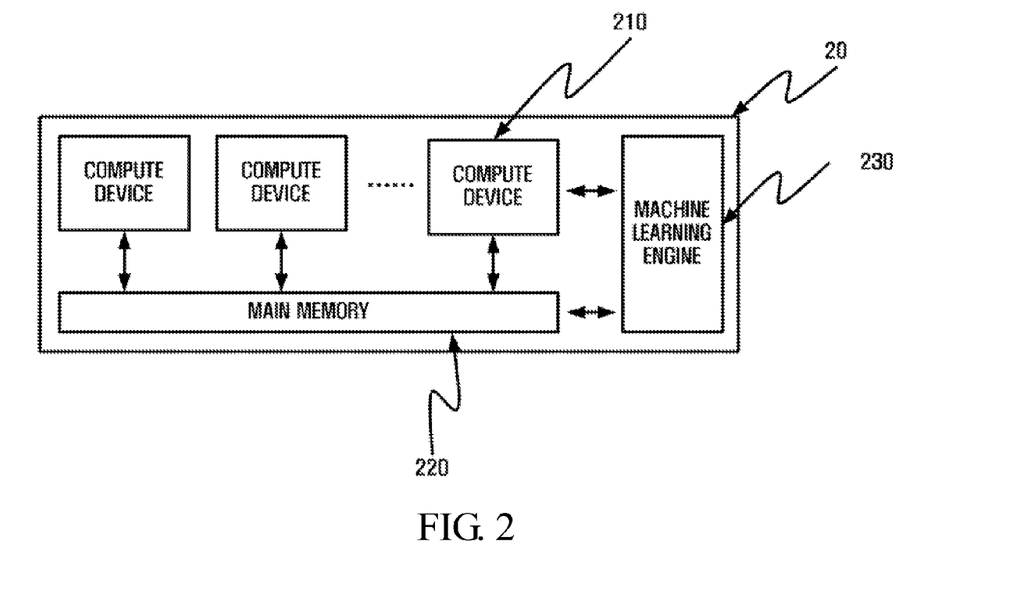
FIG. 2 is a block diagram showing a configuration of one node according to the embodiment of the present invention.

FIG. 2 is a block diagram showing one of nodes on the manycore cluster system according to the embodiment of the present invention.

The node 20 may include one or more compute devices 210, a main memory 220, and a machine learning engine 230. The node 20 can distribute a workload accompanied by execution of the OpenCL application to at least one core of each compute device 210 in the manycore cluster system 100 using the machine learning engine 230, and each compute device 210 can process the distributed workload.

In this case, the compute device 210 may perform graphic processing. The compute device 210 may perform general computation in addition to the graphic processing, and include a plurality of cores (not shown). For example, the compute device 210 may be any one of a central processing unit (CPU), a graphics processing unit (GPU), and another device supporting parallel programming (supporting, for example, OpenCL). Further, the compute device 210 may include an interface for performing communication with the main memory 220. For example, when the compute device 210 is the GPU, the interface may be peripheral component interconnect-express (PCI-E) for performing communication between the GPU and the main memory.

The main memory 220 is a device which stores a program executed by the compute device 210, data, and processing results. For example, the main memory 220 may be configured of volatile memories such as a random access memory (RAM) and/or a read only memory (ROM) or other non-volatile memories.

The machine learning engine 230 may predict a throughput of the compute device 210 and determine an amount of the workload accompanied by the OpenCL application to be distributed to each compute device 210. The predicted throughput of the compute device 210 may be extracted on the basis of a given source of kernel and hardware characteristics of each device. Further, the machine learning engine 230 may be included in only a host node within the manycore cluster system. However, without being limited thereto, the machine learning engine 230 may be configured to be included in at least one other node.

Hereinafter, an operation of distributing the workload created by the execution of the OpenCL application of the machine learning engine 230 according to the embodiment of the present invention will be described in detail with reference to FIGS. 3A to 3C.

First, the OpenCL application targeting on one compute device is executed by one node 20 of the manycore cluster system. Next, one node 20 can execute a host program of the OpenCL application. For the sake of convenience of description, one node is referred to as a "host node."

Figure 3A:
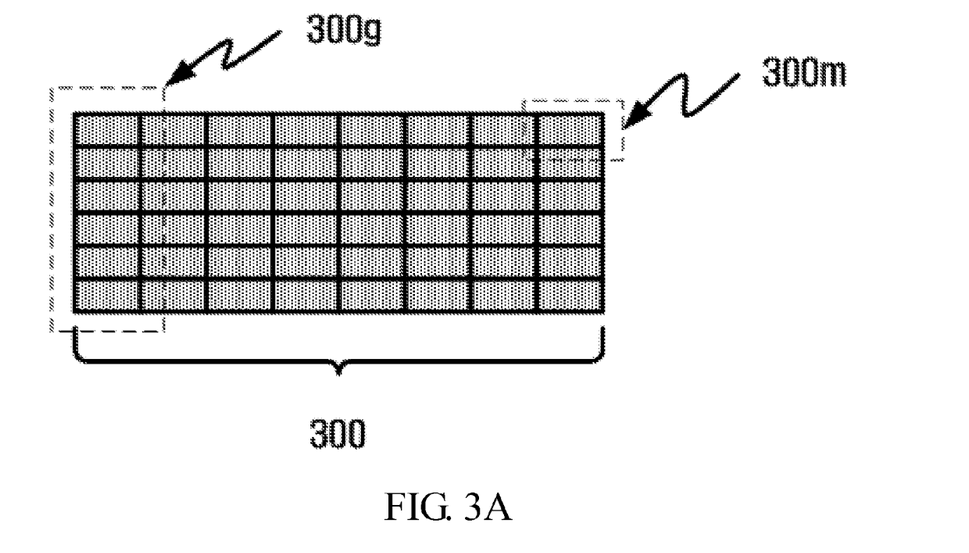
FIGS. 3A to 3C are views schematically showing a process of distributing a workload to each compute device in the manycore cluster system according to the embodiment of the present invention.
Figure 3B:
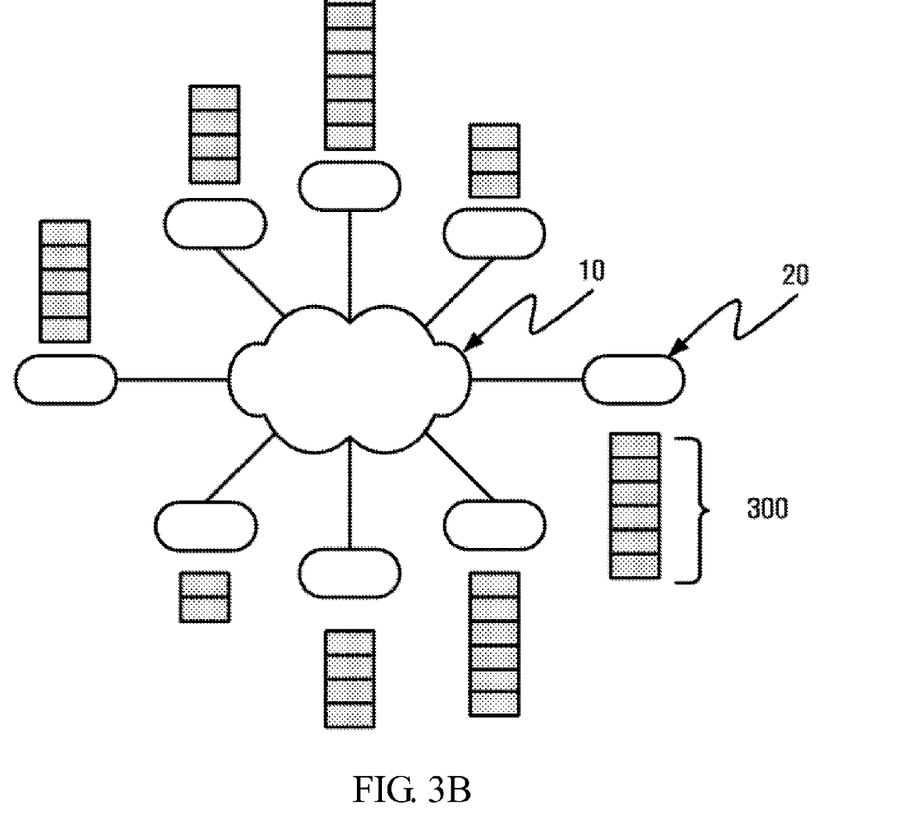
Figure 3C:
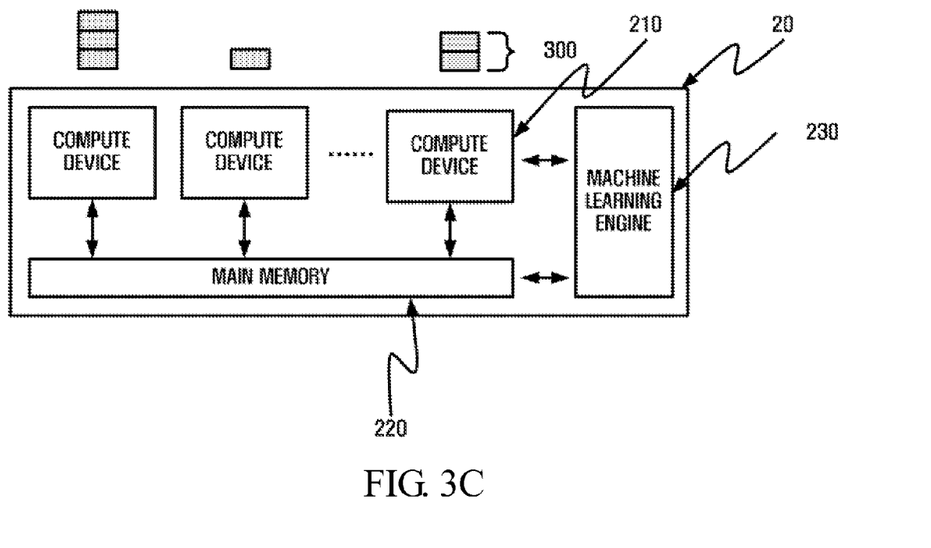

In this case, a "workload 300" of the kernel which is accompanied by the execution of the OpenCL application may be represented as a plurality of blocks as in FIG. 3A. Here, the kernel means a function made to execute programs of the OpenCL application in parallel. This function may be written in a single program multiple data (SPMD) style. One execution instance of the kernel is referred to as a "work-item." The work-item 300m may be represented as one block in FIG. 3A. Meanwhile, when the compute device is the GPU, one scalar processor in the GPU may execute one work-item. One work-group 300g may be configured of a certain number of work-items, and be represented as one column of work-items 300m in FIG. 3A. The work-group 300g may be executed in one compute device on the basis of an OpenCL run-time. A "workload 300" may be configured of at least one work-group 300g.

When the host program in the host node executes a kernel command, the machine learning engine 230 of the host node may automatically distribute the workload 300 of the kernel to each node 20 in consideration of the throughput of all the compute devices 210 in the manycore cluster system. For example, since the throughput of the core of each node 20 may be different from each other, the throughput of the workload 300 which can be processed in each node 20 may be also different. Thus, as shown in FIG. 3B, the workload 300 of the kernel of the manycore cluster system may be distributed to each node 20 in a different amount. Next, as shown in FIG. 3C, in each node 20, the different amount of workload 300 may be distributed to each compute device according to the throughput of each compute device 210. In each compute device 210, the workload 300 may be distributed according to the throughput of each core.

In this case, the manycore cluster system according to the embodiment of the present invention may execute a complier in order to distribute the workload 300 so that communication traffic between the nodes 20 is minimized. The compiler means a program for translating a source program written in a high-level language (for example, FORTRAN and ALGOL used for scientific computation, COBOL used for business computation, PL/1 used for both scientific computation and business computation, C, C++, JAVA, JSP, PAS-CAL, LIST Processing and PROLOG, etc.) and transforming the source program into a machine language which each of target machines can interpret.

The machine learning engine 230 according to the embodiment of the present invention may automatically predict the throughput of the compute device 210 using machine learning model in order to distribute the workload 300.

Machine learning model is technology that is related to development and application of an algorithm that makes a computer learn by itself. The machine learning model is introduced to predict performance of an application or patterns of behavior when the application is executed. As the machine learning model has a function capable of performing generalizing on the basis of knowledge obtained through training data, it can provide more accurate modeling. Specifically, the machine learning model may perform a function of optimizing a computer architecture and a complier in order to perform performance tuning, system mapping, and parallelism prediction of a target system.

The machine learning engine 230 according to the embodiment of the present invention may predict the throughput of the compute device 210 through the processes as described below, and distribute the workload.

(1) First, the machine learning engine 230 samples a first portion (i.e., one work-item) of the workload from the CPU of a node, and obtains the access number to the global memory of GPU. Specifically, the machine learning engine 230 may convert a given kernel into a code of extracting the access number to the global memory, and then execute the converted code in the sampled first portion of the workload to obtain the access number to the global memory. The obtained access number to the global memory is a hardware performance value of the GPU. Meanwhile, a memory region in which the sampled first portion of the workload is corrected is rolled back.

(2) Next, the machine learning engine 230 samples and executes a second portion (i.e., N work-groups among all of the work-groups) from the CPU of the node, thereby extracting a kernel feature vector x. The second portion may or may not include the first portion of the workload. Further, since one work-group is executed in one core in the CPU, "N" may generally be the number of cores included in the CPU. After the sampling is completed, the hardware performance value of the CPU may be extracted. The hardware performance value of the CPU may be the access number to the main memory, and be obtained through a means such as a performance counter library. In this case, the machine learning engine 230 may extract the kernel feature vector x on the basis of at least one of the hardware performance values of the CPU and the GPU.

(3) Next, the machine learning engine 230 may predict a execution time of the kernel using a execution-time prediction algorithm (e.g., a curve fitting algorithm), wherein the execution time is an execution time of the kernel when data of the OpenCL application is executed in the CPU and the GPU of the node.

(4) The machine learning engine 230 applies the kernel feature vector x and the predicted execution time of the kernel to Analytic model to predict an overall execution time. The analytic model is technology for predicting performance of the application or the patterns of behavior when the application is executed. The overall execution time is a execution time which each compute device requires to execute the OpenCL application. A relation between the overall execution time and the execution time of the kernel is as follows: "Overall Execution time=Kernel Execution time+Time Required For Data Transfer Between Main Memory and Compute device and Between Main Memories." Further, the kernel feature vector x may be used to predict a time required for the data movement using the analytic model.

(5) The machine learning engine 230 may predict the throughput of the compute devices included in the manycore cluster system through the overall execution time, and thus determine an amount of the workload to be distributed to each compute device.

The machine learning engine 230 according to the embodiment of the present invention can predict the throughput of the compute device using at least one of the method of predicting a kind of optimum compute device and the method of distributing the workload according to a kind of compute device. The present invention is not limited thereto. The embodiment of the present invention may include a method of predicting the throughput of the compute device 210 using various other types of machine learning methods.

Figure 4:
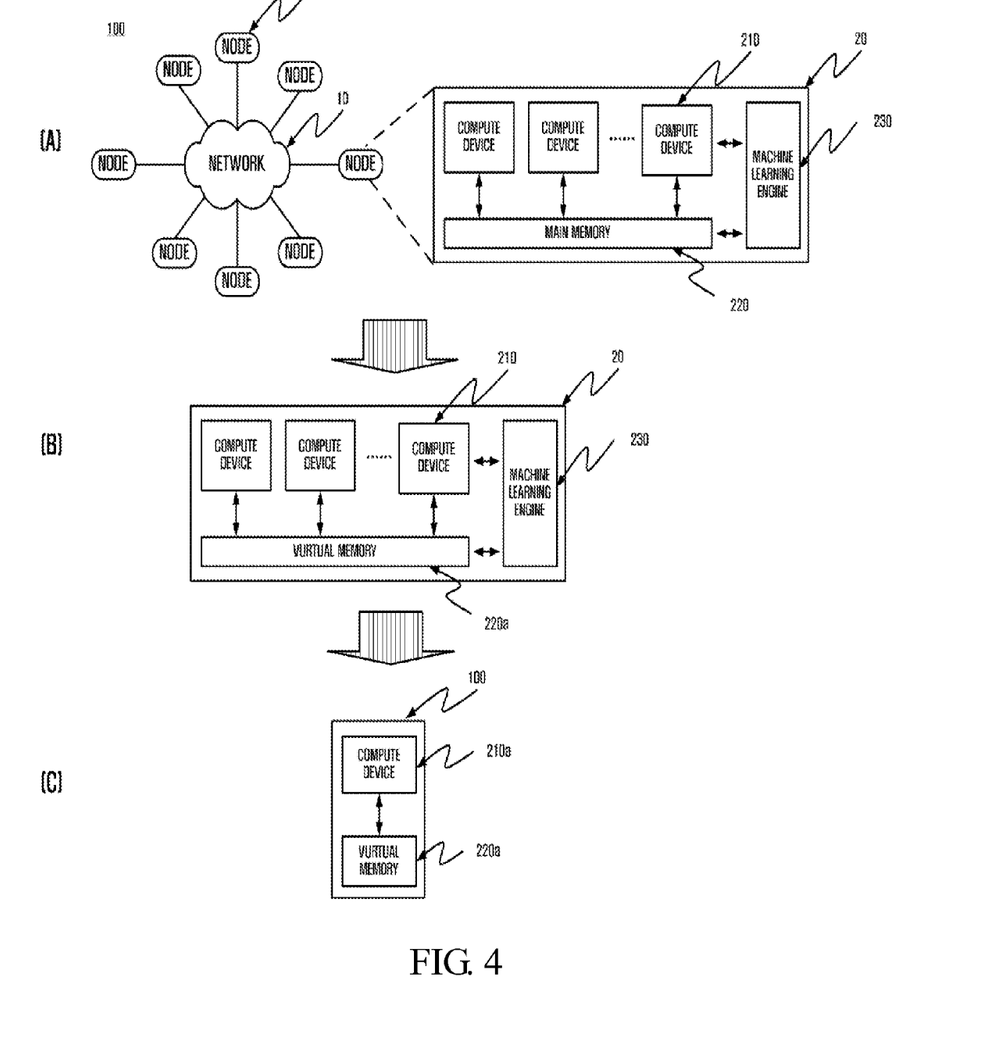
FIG. 4 is a view schematically showing virtualization of the compute device of the manycore cluster system according to the embodiment of the present invention.

As a result of distributing the workload 300 of the machine learning engine 230, the workload 300 accompanied by the OpenCL application executed by one node 20 is distributed to the compute devices 210 as in (A) of FIG. 4. Each compute device 210 in one node 20 is connected to the main memory 220 in the node 20. In view of the whole cluster system 100, a combination of main memories 220 of the nodes 20 may be represented as one virtual memory 220a. Therefore, the whole cluster system 100 may be represented as a combination of one virtual memory 220a and a plurality of compute devices 210 as in (B) of FIG. 4. Since one workload 300 of the parallel programming of the OpenCL application is distributed to each compute devices 210 and the whole compute devices 210 process one workload, the plurality of compute devices 210 may be virtualized as one compute device 210a processing a workload 300. In this case, as in (C) of FIG. 4, the whole cluster system 100 may be represented as one compute device 210a and one virtual memory 220a.

According to the embodiment of the present invention, the compute devices 210 of the nodes 20 are virtualized as one compute device 210, and thus a user can use one cluster system as one compute device 210. The method and the system according to the embodiment of the present invention can appropriately distribute the workload 300 created by the execution of the OpenCL application from one node 20 to the whole cluster system, and the user can recognize the whole cluster environment as one system in one node 20, and easily programs the OpenCL application. As a result, the OpenCL application targeting one compute device can be automatically operated on a manycore cluster environment without modifying source codes.

Figure 5:
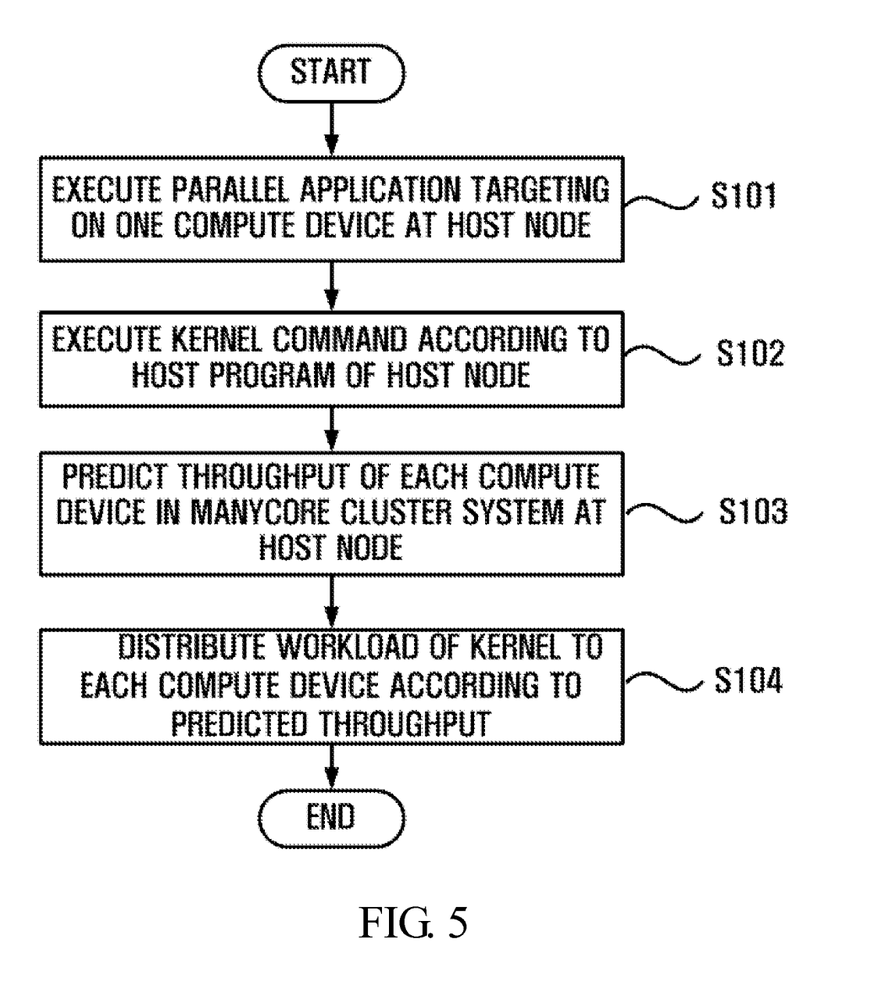
FIG. 5 is a flowchart for describing a method of executing parallel application on the manycore cluster system according to the embodiment of the present invention.

Hereinafter, a method of executing parallel application on the manycore cluster system according to the embodiment of the present invention will be described in detail with reference to FIG. 5.

First, the parallel application (e.g. the OpenCL application) targeting one compute device 210 is executed by one node 20 of the cluster system (S101). Here, one node 20 serves as a host node. The parallel application is executed through a host program of the host node.

Next, the host program of the host node executes a kernel command (S102).

The host node predicts a throughput of each compute device 210 within the manycore cluster system in order to distribute the workload 300 of the kernel created by execution of the parallel application to other nodes 20 of the manycore cluster system (S103). To this end, the machine learning engine 230 of the host node may predict an overall execution time for executing the parallel application in each compute device, and predicts the throughput of each compute device 210. In this case, the machine learning engine 230 may sample only a part of the workload for a given kernel. predict a kernel feature vector and a execution time of a kernel, and predict the overall execution time on the basis of the kernel feature vector and the execution time.

The host node distributes the workload 300 of the kernel to the compute devices 210 according to the predicted throughput (S104). An amount of the workload 300 allocated to each compute device 210 may be different or equal and differ according to the number of cores in the CPU and the number of cores in the GPU.

In this process, the workload 300 in each node 20 may be distributed without modifying the source codes of the parallel application, and the parallel application may be operated by each node 20. Thus, one manycore cluster system may be visualized as one entity configured of one memory and the compute device 210.

Meanwhile, the method of executing the parallel application on the manycore cluster system according to the above-described embodiment may also be realized in the form of a recording medium including a computer-executable command such as a program module executed by a computer. The computer-readable medium may be an arbitrary available medium that can be accessed by a computer, and includes all of volatile and non-volatile media, and removable and non-removable media. Further, the computer-readable medium may include all of computer storage media and communication media. The computer-readable medium include all of volatile and non-volatile media, and removable and non-removable media implemented by any method or technology for storing information such as computer-readable commands, data structures, program modules, or other data. The communication media typically includes computer-readable commands, data structures, program modules or other data of modulated data signals such as carrier waves, or other transmission mechanisms, and any information transmitting media.

The above description of the present invention is merely intended to illustratively describe the technical spirit of the present invention, and various changes and modifications can be made by those skilled in the art without departing from the essential features of the present invention. Therefore, the embodiments disclosed herein are not intended to limit the technical spirit of the present invention, but are intended to describe the present invention. For example, elements described in a single type may be distributed and implemented, and similarly, elements described in a distributed type may be implemented in a combination form.

What is claimed is:

1. A method of executing parallel application on a manycore cluster system comprising a plurality of nodes, each of which comprises at least one compute device, the method comprising the steps of:
   a) executing a parallel application by at least one node;
   b) predicting a data throughput of the at least one compute device comprised in each node by the at least one node; and
   c) distributing a workload accompanied by the execution of the parallel application to the at least one compute device comprised in each node according to the predicted data throughput of the compute device,
   wherein the step b) comprises the sub-steps of:
   b1) extracting a feature value of a kernel for the manycore cluster system;
   b2) predicting an execution time of the kernel using an execution-time prediction algorithm;
   b3) predicting an overall execution time which the manycore cluster system requires to execute the parallel application, on the basis of the feature value of the kernel and the execution time of the kernel; and
   b4) predicting the data throughput of each compute device on the basis of the predicted overall execution time,
   wherein the sub-step b1) comprises the sub-steps of:
   b11) sampling a first portion of the workload from a central processing unit (CPU) of the at least one node to extract a hardware performance value of a graphics processing unit (GPU) included in the at least one node on the basis of the sampled first portion of the workload;
   b12) sampling a second portion of the workload from the CPU from which the first portion of the workload is sampled, and extracting a hardware performance value of the CPU from which the second portion of the workload is sampled; and
   b13) extracting a feature vector of the kernel of the compute device within the at least one node on the basis of at least one of the hardware performance values of the CPU and the GPU.

2. The method according to claim 1, wherein the compute device comprises any one of the CPU, the GPU, and another device supporting the execution of the parallel application.

3. The method according to claim 1, wherein the step c) comprises distributing the workload to the at least one compute device without modification of source codes of the parallel application.

4. The method according to claim 1, wherein the manycore cluster system is a heterogeneous manycore cluster system.

5. A manycore cluster system comprising a plurality of nodes, each of which comprises at least one compute device and executes a parallel application, wherein:
   at least one of the plurality of nodes comprises a machine learning engine that predicts a data throughput of the at least one compute device; and
   a workload accompanied by the parallel application executed by at least one of the plurality of nodes is distributed to the at least one compute device according to the data throughput of the compute device which is predicted by the machine learning engine,
   wherein the machine learning engine performs the steps of:
   a) extracting a feature value of a kernel for the manycore cluster system;
   b) predicting an execution time of the kernel using an execution-time prediction algorithm;
   c) predicting an overall execution time which the manycore cluster system requires to execute the parallel application, on the basis of the feature value of the kernel and the execution time of the kernel; and
   d) predicting the data throughput of each compute device on the basis of the predicted overall execution time,
   wherein the step a) performed by the machine learning engine comprises the sub-steps of:
   a1) sampling a first portion of the workload from a central processing unit (CPU) of the at least one node to extract a hardware performance value of a graphics processing unit (GPU) included in the at least one node on the basis of the sampled first portion of the workload;
   a2) sampling a second portion of the workload from the CPU from which the first portion of the workload is sampled, and extracting a hardware performance value of the CPU from which the second portion of the workload is sampled; and
   a3) extracting a feature vector of the kernel of the compute device within the at least one node on the basis of at least one of the hardware performance values of the CPU and the GPU.

6. The manycore cluster system according to claim 5, wherein the compute device comprises any one of the CPU, the GPU, and another device supporting the execution of the parallel application.

7. The manycore cluster system according to claim 5, wherein the workload is distributed to the at least one compute device without modification of source codes of the parallel application.

8. The manycore cluster system according to claim 5, wherein the manycore cluster system is a heterogeneous manycore cluster system.

* * * * *